United States Patent [19]

Münch

[11] Patent Number: 4,779,828

[45] Date of Patent: Oct. 25, 1988

[54] DETACHABLE CLAMPING BRACKET

[75] Inventor: Udo Münch, Sinn, Fed. Rep. of Germany

[73] Assignee: Rittal-Werk Rudolf Loh GmbH & Co. KG, Fed. Rep. of Germany

[21] Appl. No.: 84,615

[22] Filed: Aug. 12, 1987

[30] Foreign Application Priority Data

Aug. 16, 1986 [DE] Fed. Rep. of Germany ....... 8622078

[51] Int. Cl.⁴ ............................................. B65D 67/02
[52] U.S. Cl. .................. 248/74.3; 248/74.4; 24/16 PB; 24/339
[58] Field of Search ............... 248/67.5, 74.1, 74.3, 248/74.4, 316.5, 544; 24/16 PB, 487, 543, 335, 339

[56] References Cited

U.S. PATENT DOCUMENTS

| | | | |
|---|---|---|---|
| 2,884,214 | 4/1959 | Wrobel | 24/16 PB |
| 3,160,280 | 12/1964 | Burch | 248/544 X |
| 3,632,069 | 1/1972 | Thayer | 248/74.3 X |
| 3,632,071 | 1/1972 | Cameron | 248/74.3 |
| 4,395,009 | 7/1983 | Bormke | 248/74.4 X |
| 4,475,706 | 10/1984 | Anderson | 248/544 X |
| 4,564,163 | 1/1986 | Barnett | 248/74.3 X |
| 4,669,688 | 1/1987 | Itoh | 248/74.3 X |

FOREIGN PATENT DOCUMENTS

| | | |
|---|---|---|
| 7334806 | 12/1973 | Fed. Rep. of Germany . |
| 2446133 | 4/1975 | Fed. Rep. of Germany ..... 248/74.3 |
| 2399786 | 4/1979 | France .............................. 248/544 |
| 7601536 | 8/1977 | Netherlands ...................... 248/74.3 |
| 1022820 | 3/1966 | United Kingdom ................ 24/339 |
| 1600605 | 10/1981 | United Kingdom ............... 248/74.3 |

OTHER PUBLICATIONS

Giertz, R. L., "Strap Retainer and Method of Utilization in Forming Exchange Cables", Western Electric Technical Digest No. 26, pp. 33–34, Apr. 1972.

Primary Examiner—Alvin C. Chin-Shue
Assistant Examiner—Robert A. Olson
Attorney, Agent, or Firm—Thomas W. Speckman; Ann W. Speckman

[57] ABSTRACT

A detachable clamping bracket for securely retaining tubes having axially movable cables therein comprising a base member attachable to a wall, the base member having a contoured arm with a concave surface and a hinged bracket arm having a concave surface which, in combination with said base member arm, is adjustable to a closed position wherein the tube is securely supported by said concave surfaces. At least one band is disposed laterally with respect to said base member and bracket arms and firmly attached to said base member, which band is adjustable to a closed position in which it encircles and securely supports said cables.

14 Claims, 3 Drawing Sheets

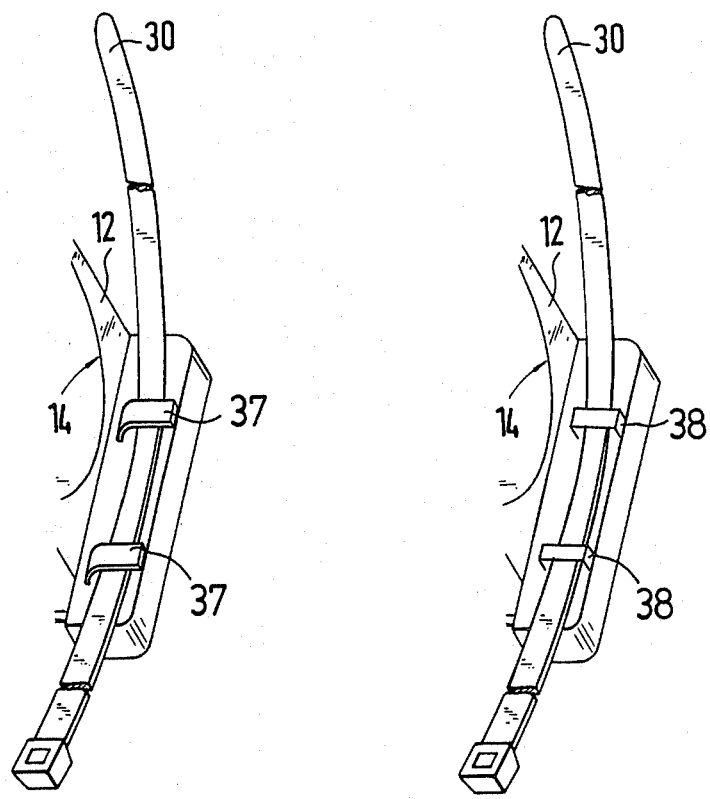

DETACHABLE CLAMPING BRACKET

BACKGROUND OF THE INVENTION

1. Field of the Invention

The present invention relates to a detachable clamping bracket for use with tubes having axially movable cables therein, the bracket comprising a base member which is attachable, for example, to a wall, the base member having a contoured arm with a concave surface which cooperates with and accommodates the tube, and a bracket arm connected to the base member arm in an articulated manner, the bracket arm also having a concave surface which cooperates with and accommodates the tube, the free end of the bracket arm having a locking coupling means with a prong which is detachably connectible to a locking coupling means on the base member arm.

2. Description of the Prior Art

Clamping brackets of the general type described above are known. Thus, for example, DE-GM No. 73 34 806 describes a support holder in which the connection between the free end of the bracket and the free end of the arm is achieved by means of two hooks directed against one another. The connecting point is located above the base member. Such clamping brackets are generally used as support or holding means for tubes, pipes, or the like, in that the base member is attached to a wall, for example, and the tube is then inserted into the clamping bracket. When the free end of the bracket is then connected with the free end of the base member arm, the tube is securely supported in the clamping bracket. It is often the case, however, that cables for connection to electrical devices are provided in the tubes. These cables, which may have considerable weight, may act in a disadvantageous manner on the connecting elements of the device.

SUMMARY OF THE INVENTION

It is an object of the present invention to provide a clamping bracket of the type described above, without adding significantly to the cost of the device, and which, in its closed condition, securely supports the tube and the cables to reduce stress on the cables and the clamping bracket.

This objective is achieved in accordance with the present invention in that at least one band is disposed laterally from the concave surface of the base member arm and is firmly attached to the clamping bracket, which band, in the closed condition of the clamping bracket, securely supports the cables while the end of the tube is supported between the bracket arm and the base member arm.

According to the present invention, support of the tube and cables in the clamping bracket is provided by at least two supporting bodies which are independent of one another. Since the band, which may have several embodiments, holds the cables against the base member, it is also ensured that forces due especially to axial movements of the cables are transferred to the stationary base member. Likewise, the bracket arm, which provides a connection between the tube and the clamping bracket, is significantly relieved of stress. The locking coupling means of the clamping bracket are thereby relieved of stress, since forces are absorbed by both the clamping bracket and the band.

Further advantageous and suitable embodiments of the invention will be described in greater detail below.

By means of apertures for retaining the band which are provided in the base member and which open toward base member arm, a connection may be established between the band and the base member by simple measures, in which the band is threaded through the apertures, and is then fastened to enclose the cables. Suitable apertures are of the type having one surface facing the cables, while the other surface is open toward the wall.

To provide secure support of the base member on the wall, a further embodiment of the present invention provides that a recess is provided in the part of the base member which faces the wall, into which recess both apertures discharge. The recess is preferably generally rectangular and its depth is greater than the thickness of the band. It is thereby ensured that the band only contacts the wall to a limited degree, if at all. In accordance with this arrangement, the contact surface of the base member may be supported securely against the wall.

A further suitable embodiment of the present invention provdes that the base member has a recessed wall in the area of its locking connection with the bracket arm, in which recess the prong of the bracket arm is positioned in the closed condition of the clamping bracket. The construction of the prong end of the bracket arm thus provides that the clamping bracket, in its closed condition, is positioned in a fixed but detachable manner in the base member. If the width of the recess corresponds to the width of the prong part of the bracket arm, then a connection between the prong and the base member may be achieved which ensures that the clamping bracket absorbs even forces acting in the axial direction of the tube without the connection between the prong and the base member arm loosening, since the bracket transfers these forces to the base member.

In this connection, it is especially preferred if the prong part of the bracket arm is connectible in a form-locking manner with the base member. In order to be able, in such case, to easily detach the prong of the bracket arm from the base member arm, another embodiment of the invention provides that an aperture is formed in the closed condition of the clamping bracket between the free end of the bracket arm and the base member arm. If this aperture is formed in a wedge-shaped manner, then the connection may be easily disconnected, for example, by means of a screwdriver.

The connection between the band and the base member may be provided in other ways. Instead of the apertures, flaps or eyes may be provided on the base member, from which the band may be suspended.

Clamping brackets of this type generally comprise plastic, and may be produced by means of an injection molding process.

BRIEF DESCRIPTION OF THE DRAWINGS

One embodiment of the invention is illustrated in greater detail in the figures, in which:

FIG. 4 shows the connection between the base member and the bracket arm in the area of the locking coupling means with the bracket arm shown in cross-section and FIG. 5 shows attachment of the band to the base by flaps; and FIG. 6 shows attachment of the band to the base by eyes.

DESCRIPTION OF PREFERRED EMBODIMENTS

Figure 1:
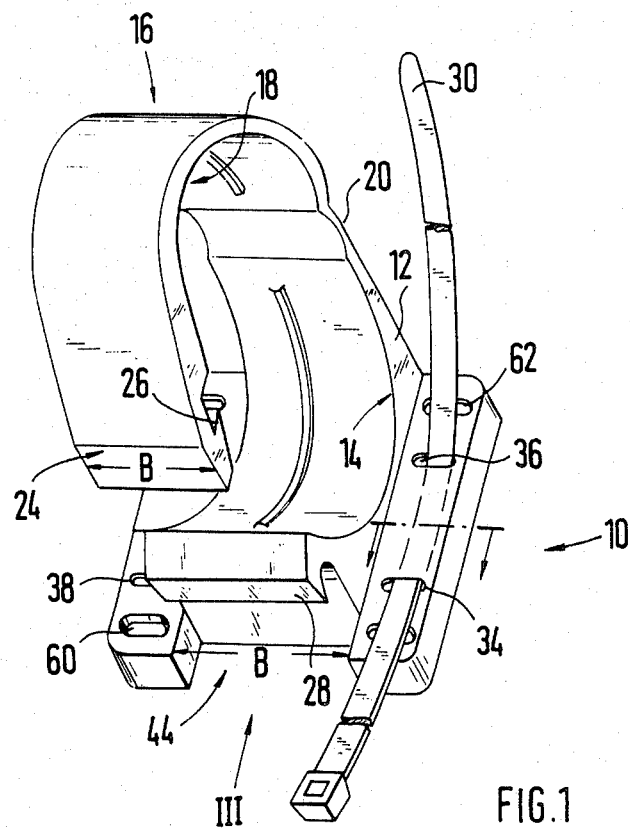
FIG. 1 shows a perspective view of a clamping bracket in an open condition without a tube.
Figure 2:
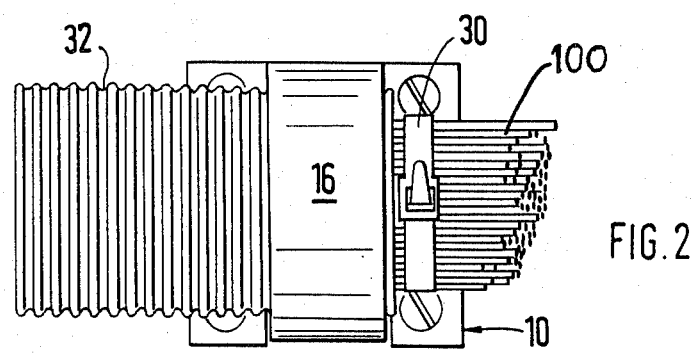
FIG. 2 shows a clamping bracket in the closed condition supporting a tube and cables.

The figures show a detachable clamping bracket for tubes or the like comprising base member (10) which is attachable to a wall, for example, base member (10) having a contoured arm 12) with a concave surface (14) which cooperates with and accommodates the tube. Furthermore, the clamping bracket has a bracket arm (16) with concave surface (18) which cooperates with and accommodates the tube. The bracket arm is connected to the base member arm in an articulated manner, preferably by means of a film hinge (20). The free end of bracket arm (16) is provided with a locking coupling means (24) with prong (26). This coupling means is detachably connectible to a corresponding locking coupling means (28) of base member arm (12). Disposed laterally with respect to concave surface (14) of base member arm (12), at least one band (30), which is securely connectible to the clamping bracket, is positioned, which band, in the closed condition, firmly encircles cables (100), as shown FIG. 2. The end of tube (32) is supported between bracket arm (16) and base member arm (12).

Figure 3:
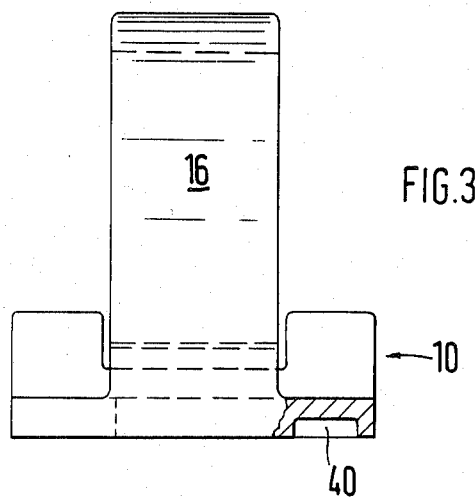
FIG. 3 shows a lateral view from the direction of arrow III shown in FIG. 1, with one area partially cut away.

Apertures (34, 36, and 38) for band (30) are provided in base member (10), which apertures are open toward concave surface (14) of base member arm (12). The part of base member (10) which faces the wall is preferably provided with a recess (40), as shown in FIG. 3, into which apertures (34, 36, and 38) discharge. Recess (40) is generally rectangular, and its depth is greater than the thickness or the width of band (30).

In the area of its locking coupling means (28), base member (10) is provided with recess (44) in which locking coupling means (24) and prong (26) of bracket arm (16) are positioned in the closed condition of the clamping bracket. The width (B) of recess (44) corresponds generally to the width of the prong on bracket arm (16). This recess is shaped so that the prong of bracket arm (16) is connectible in a form-locking manner with base member (10).

Figure 4:
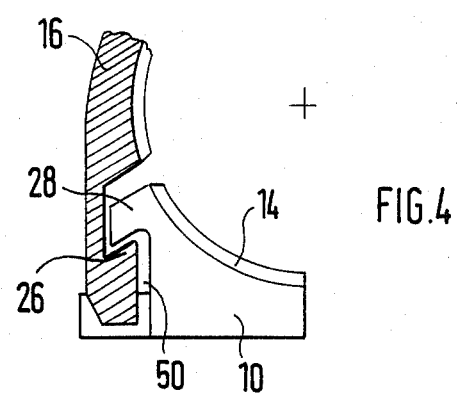

In the closed condition of the clamping bracket, an aperture (50) is preferably formed between the free end of bracket arm (16) and base member (10), as shown in FIG. 4. Aperture (50) aids in detaching the connection between the base member arm and the bracket arm. The end of a screwdriver, for example, may be inserted into it, and the locking coupling means may be detached from one another by turning the screwdriver. Attachment of the band to the base member may also be provided by means of flaps (37) or eyes (38) provided on the base member, as shown in FIGS. 5 and 6, from which the band may be suspended.

Base member (10) furthermore has openings (60, 62) which, with suitable fastening means, provide connection of the clamping bracket to a wall, which is not described here in further detail.

I claim:

1. A detachable clamping bracket for use in supporting tubes having axially movable cables therein, said detachable clamping bracket comprising: a base member having means for attachment of one side to a wall and having on its other side a contoured arm with a concave surface, a free end of said contoured arm having a first locking coupling means, the other end of said contoured arm connected to one end of a bracket arm in an articulated manner, said bracket arm having a concave surface, said concave surfaces of said contoured arm and said bracket arm sized to securely hold said tube, a free end of said bracket arm having a second locking coupling means engageable with said first locking coupling means to securely hold an end of said tube, said base member having a locking coupling means recess sized to accommodate said free end of said bracket arm in fixed position when said first and second locking coupling means are engaged thereby preventing axial movement of said free end of said bracket arm; and at least one band attached to said base member by apertures provided in said base member and displaced axially with respect to said contoured arm, said band having an adjustable closing means to provide a closed position sized to securely hold said cables.

2. A clamping bracket in accordance with claim 1, characterized in that a first recess is provided in a surface of said base member which faces the wall and said apertures discharge into said first recess.

3. A clamping bracket in accordance with claim 2, characterized in that said first recess is generally rectangular and has a depth greater than the thickness of said band.

4. A clamping bracket in accordance with claim 3, characterized in that said bracket arm locking coupling means is connectible to said base member locking coupling means in a form-locking manner.

5. A clamping bracket in accordance with claim 4, characterized in that a locking aperture (26) is located on the inside of said free end of said bracket arm locking coupling means and said base member locking coupling means engages said locking aperture in said closed condition of said clamping bracket.

6. A clamping bracket in accordance with claim 5, characterized in that said locking aperture has a wedge-like shape bottom lip.

7. A clamping bracket in accordance with claim 6, characterized in that said apertures comprise flaps.

8. A clamping bracket in accordance with claim 6, characterized in that said apertures comprise eyes.

9. A clamping bracket in accordance with claim 1, characterized in that a first recess is provided in a surface of said base member which faces the wall.

10. A clamping bracket in accordance with claim 9, characterized in that said first recess is generally rectangular and has a depth greater than the thickness of said band.

11. A clamping bracket in accordance with claim 1, characterized in that an aperture is formed between the free end of said bracket arm locking coupling means and said base member locking coupling means in said closed condition of said clamping bracket.

12. A clamping bracket in accordance with claim 11, characterized in that said aperture has a wedge-like shape.

13. A clamping bracket in accordance with claim 1, characterized in that said apertures comprise flaps.

14. A clamping bracket in accordance with claim 1, characterized in that said apertures comprise eyes.

* * * * *